(12) United States Patent
Micelli

(10) Patent No.: US 9,433,196 B1
(45) Date of Patent: Sep. 6, 2016

(54) EXPANDABLE, COLLAPSIBLE, AERODYNAMIC, SEGMENTED FISHING LURE

(71) Applicant: Joseph Micelli, West Hempstead, NY (US)

(72) Inventor: Joseph Micelli, West Hempstead, NY (US)

( * ) Notice: Subject to any disclaimer, the term of this patent is extended or adjusted under 35 U.S.C. 154(b) by 153 days.

(21) Appl. No.: 14/309,200

(22) Filed: Jun. 19, 2014

(51) Int. Cl.
*A01K 85/18* (2006.01)
*A01K 85/00* (2006.01)

(52) U.S. Cl.
CPC ............ *A01K 85/00* (2013.01); *A01K 85/18* (2013.01)

(58) Field of Classification Search
CPC .............................. A01K 85/18; A01K 85/00
USPC ........................................................ 43/42.15
See application file for complete search history.

(56) References Cited

U.S. PATENT DOCUMENTS

| 1,545,683 | A | * | 7/1925 | Nowak | A01K 85/00 |
| | | | | | 43/42.15 |
| 1,557,644 | A | * | 10/1925 | Andersen | A01K 85/18 |
| | | | | | 43/42.15 |
| 1,692,935 | A | * | 11/1928 | Heddon | A01K 85/18 |
| | | | | | 43/42.15 |
| 2,027,069 | A | * | 1/1936 | Sorenson | A01K 85/02 |
| | | | | | 43/42.36 |
| 2,167,334 | A | * | 7/1939 | Hayes | A01K 85/18 |
| | | | | | 43/42.36 |
| 2,185,668 | A | * | 1/1940 | Hurdle | A01K 85/00 |
| | | | | | 43/42.28 |
| 2,219,983 | A | * | 10/1940 | Evenson | A01K 91/14 |
| | | | | | 43/43.13 |
| 2,261,549 | A | * | 11/1941 | Hayes | A01K 85/16 |
| | | | | | 43/42.36 |
| 2,316,048 | A | * | 4/1943 | Clarke | A01K 85/00 |
| | | | | | 43/42.24 |
| 2,478,801 | A | * | 8/1949 | Yungel | A01K 85/00 |
| | | | | | 43/42.15 |

(Continued)

FOREIGN PATENT DOCUMENTS

JP        10225246 A  *  8/1998
JP     2003250393 A  *  9/2003

(Continued)

*Primary Examiner* — Darren W Ark
(74) *Attorney, Agent, or Firm* — Alfred M. Walker

(57) ABSTRACT

An aerodynamic fish lure facilitates collapsible closing of the lure for farther casting distance and accuracy when cast off in the air. The air casting event causes the lure's jointed segments to contract in length together in the air and then to expand in length as the lure hits the water. Then the lure either skims along the surface of the water or is submerged under the water and can pivot in two or more axial directions, or at any angles therebetween. Connectors connect the segments, and retract in or out of respective recesses in the respective segments, which are designed to permit the collapsing of the length of the lure in the air as well as the lure's expansion or contraction in any axial direction or angle therebetween, in length in the water. The segments also laterally pivot, imitating wiggling of lure bait on or in the water.

6 Claims, 6 Drawing Sheets

(56) References Cited

U.S. PATENT DOCUMENTS

| | | | | |
|---|---|---|---|---|
| 2,494,407 A * | 1/1950 | Rhodes | A01K 85/12 | 43/42.36 |
| 2,545,398 A * | 3/1951 | Warobiew | A01K 85/12 | 43/42.16 |
| 2,595,168 A * | 4/1952 | Roth | A01K 85/14 | 43/42.15 |
| 2,685,145 A * | 8/1954 | Dean | A01K 85/12 | 43/42.16 |
| 2,708,805 A * | 5/1955 | Garvie | A01K 85/14 | 43/42.15 |
| 2,722,766 A * | 11/1955 | Accetta | A01K 85/00 | 43/42.36 |
| 2,785,497 A * | 3/1957 | Berry | A01K 85/16 | 43/42.36 |
| 2,814,086 A * | 11/1957 | Bahr | A01K 91/04 | 43/44.83 |
| 2,865,130 A * | 12/1958 | Accetta | A01K 85/00 | 43/42.15 |
| 2,910,799 A * | 11/1959 | Wentworth | A01K 85/16 | 43/42.15 |
| 3,110,979 A * | 11/1963 | Woodley | A01K 85/00 | 43/42.13 |
| 3,165,857 A * | 1/1965 | Koziba | A01K 85/18 | 43/42.15 |
| 3,172,227 A * | 3/1965 | Mackey | A01K 85/18 | 43/42.15 |
| 3,230,656 A * | 1/1966 | Kozjak | A01K 85/02 | 43/42.15 |
| 3,344,550 A * | 10/1967 | Peters | A01K 85/16 | 43/42.36 |
| 3,427,744 A * | 2/1969 | Roberts | A01K 85/18 | 43/42.05 |
| 3,429,066 A * | 2/1969 | McClellan | A01K 85/00 | 43/42.24 |
| 3,440,757 A * | 4/1969 | McClellan | A01K 85/00 | 43/42.36 |
| 3,521,394 A | 7/1970 | Wintersberger | | |
| 3,537,207 A * | 11/1970 | McClellan | A01K 85/00 | 43/42.15 |
| D226,191 S | 1/1973 | Hanna | | |
| 3,867,781 A * | 2/1975 | Wolfe | A01K 85/00 | 43/42.36 |
| 3,965,606 A * | 6/1976 | Bingler | A01K 85/00 | 43/42.16 |
| 4,208,822 A | 6/1980 | Bryant | | |
| 4,235,037 A * | 11/1980 | Sivertsen | A01K 95/00 | 43/44.91 |
| 4,573,282 A * | 3/1986 | Rowe | A01K 85/18 | 43/42.15 |
| 4,654,995 A * | 4/1987 | Rapelje | A01K 85/18 | 43/42.15 |
| 4,676,020 A | 6/1987 | Taylor et al. | | |
| 4,873,782 A * | 10/1989 | Gudermuth, Jr. | A01K 85/18 | 43/42.15 |
| 4,881,340 A * | 11/1989 | Davis | A01K 85/16 | 43/42.15 |
| 4,893,430 A * | 1/1990 | Barfield | A01K 85/00 | 43/42.24 |
| 5,113,615 A * | 5/1992 | Drachkovitch | A01K 85/10 | 43/42.19 |
| 5,182,875 A * | 2/1993 | Righetti | A01K 85/18 | 43/42.09 |
| 5,406,738 A * | 4/1995 | Holleman, Sr. | A01K 85/18 | 43/42.15 |
| 5,522,170 A * | 6/1996 | Cole | A01K 85/18 | 43/42.15 |
| 5,787,633 A | 8/1998 | Taylor | | |
| 6,182,390 B1 * | 2/2001 | Watkins | A01K 85/08 | 43/42.11 |
| 6,460,286 B1 * | 10/2002 | Wilson | A01K 85/18 | 43/42.15 |
| 6,665,977 B2 * | 12/2003 | Hammond | A01K 85/00 | 43/42.36 |
| 6,763,631 B1 | 7/2004 | Santini | | |
| 6,941,696 B2 * | 9/2005 | Kato | A01K 85/16 | 43/42.24 |
| D570,444 S | 6/2008 | Scott et al. | | |
| D621,469 S | 8/2010 | Dennison et al. | | |
| 7,788,842 B2 * | 9/2010 | Tsai | A01K 85/18 | 43/42.15 |
| 8,091,271 B2 * | 1/2012 | Mayer | A01K 85/00 | 43/42.36 |
| 8,181,382 B2 | 5/2012 | Pack | | |
| 8,230,639 B2 * | 7/2012 | Langer | A01K 85/00 | 43/42.15 |
| D683,420 S | 5/2013 | Rago | | |
| 8,458,950 B2 * | 6/2013 | Mayer | A01K 85/00 | 43/42.09 |
| 8,769,863 B2 * | 7/2014 | Baker | A01K 85/18 | 43/42.15 |
| 8,776,428 B2 * | 7/2014 | Langer | A01K 85/12 | 43/42.15 |
| 8,789,308 B2 * | 7/2014 | Hughes | A01K 85/18 | 43/42.15 |
| 8,793,924 B2 * | 8/2014 | Hughes | A01K 85/18 | 43/42.15 |
| 8,978,289 B2 * | 3/2015 | Willis | A01K 85/00 | 43/42.15 |
| 2002/0073607 A1 * | 6/2002 | Hickok | A01K 85/00 | 43/42.25 |
| 2002/0189150 A1 * | 12/2002 | Thorne | A01K 85/18 | 43/42.15 |
| 2006/0059767 A1 * | 3/2006 | Tsai | A01K 85/16 | 43/42.15 |
| 2006/0260176 A1 * | 11/2006 | Yeung | A01K 85/18 | 43/42.15 |
| 2007/0175083 A1 * | 8/2007 | Wilson | A01K 85/02 | 43/42.15 |
| 2008/0078114 A1 | 4/2008 | Pack | | |
| 2008/0115402 A1 * | 5/2008 | Helmin | A01K 85/14 | 43/42 |
| 2015/0208624 A1 * | 7/2015 | Krohn | A01K 85/00 | 43/42.49 |

FOREIGN PATENT DOCUMENTS

| | | | |
|---|---|---|---|
| JP | 2003289760 A | * | 10/2003 |
| JP | 2004357646 A | * | 12/2004 |
| JP | 2005137281 A | * | 6/2005 |
| JP | 2005185254 A | * | 7/2005 |
| JP | 2005348673 A | * | 12/2005 |
| JP | 2005348687 A | * | 12/2005 |
| JP | 2006042633 A | * | 2/2006 |
| JP | 2006197877 A | * | 8/2006 |
| JP | 2007053956 A | * | 3/2007 |
| JP | 2007061070 A | * | 3/2007 |
| JP | 2008118898 A | * | 5/2008 |
| JP | 2008182996 A | * | 8/2008 |
| JP | 2008253240 A | * | 10/2008 |
| JP | 2010193801 A | * | 9/2010 |
| JP | 2012044972 A | * | 3/2012 |
| JP | 2012200255 A | * | 10/2012 |
| JP | 2013009687 A | * | 1/2013 |
| JP | 2013176305 A | * | 9/2013 |
| TW | EP 1763996 A1 * | 3/2007 | A01K 85/18 |

* cited by examiner

EXPANDABLE, COLLAPSIBLE, AERODYNAMIC, SEGMENTED FISHING LURE

FIELD OF THE INVENTION

The present invention relates to an expandable, collapsible, aerodynamic, segmented fishing lure.

BACKGROUND OF THE INVENTION

In U.S. Pat. No. 4,676,020 of Taylor, a fishing lure has a fixed outer body 14, with a flexible color changing sock body 24 in the non-expandable outer body 14, to effect a changing coloration effect, when the sock body expands or collapses in length within the transparent fixed lure body 14. The purpose of the collapsing and lengthening is not for aerodynamic casting, nor for extension of length in the water. Instead, the purpose is to change colors of the expandable sock body 24, to attract fish to the color changing.

U.S. Pat. No. 4,208,822 of Bryant discloses an expandable length element not related to the segmented lure.

U.S. Pat. No. 5,182,875 of Righetti describes a fishing lure which has multiple segments which are pivotably connected to permit the lure 100 to simulate a wiggling bait fish, as in FIG. 9 therein. There is a centrally located linear membrane 900 connecting the segments, which then will pivot and articulate while wiggling, but there does not appear to be a large gap to cause significant collapsing and expansion of the lure body 100 of Righetti '875.

U.S. Pat. No. 6,460,286 B1 of Wilson generally discloses a lure with segmented body. Wilson's patent discloses the segments being connected by mechanical hinges 58 that pivot inside cavities of the segments. However, Wilson states in claim 2, paragraph "c" at column 7, lines 20-24 that the snap fit of the hinges operates in "constraining said fishing lure to lateral articulation," (i.e. sideways movements).

US Patent Application Publication 2008/00678114 A1 of Pack and U.S. Pat. No. 8,181,382 B2, also of Pack, describe a segmented fishing lure connected by flexible strips 315 in FIGS. 1-38 and 5A-9C, or by swivel joints 401, but mainly for rotating back and forth motion in sideways lateral articulation.

A significant distinction, however, between the fishing lures disclosed in Pack, Wilson and Righetti is that gaps between segments are provided, it does not appear that there is longitudinal movements of the segments, as opposed to pivotal articulating sideways movements, to simulate wiggling of the bait fish.

U.S. Pat. No. 4,654,995 of Rapelje and U.S. Pat. No. 3,521,394 of Winterberger also disclose laterally pivotable lures. Huang (of which I was the patent attorney) discloses a unitary, non-segmented single piece lure with a forward pivotable lip that aligns with the lure in the air, but pivots down in the water to create resistance to simulate wiggling of a bait fish.

US Design Patent no. D683,420 S of Rago discloses fishing lure with reverse forward facing open segment surfaces, but it appears to be pivotable to simulated wiggling, not for collapsing and expansion of the length of the fishing lure.

SUMMARY OF THE INVENTION

An expandable, collapsible, aerodynamic, segmented fishing lure is in the outline shape of a typical fishing lure simulating a bait fish, such as normally having a front head portion, a mid body portion and a rear tail fin portion, with appropriately placed hooks. Known prior art patents include those disclosing segmented lures, but which are not expandable and collapsible in size.

However, the body portion of the lure is segmented into a plurality of segments, each connected by connectors which permit the segments of the lure to be thrust adjacent to each other when casting off, to maximize aerodynamic flying and casting distance.

In regard to how the fishing lure assumes a collapsed, compressed state of the segments in the aforementioned casting flight, the casting occurs when the fisher person starts by holding the fishing rod over his or her shoulder, with the line dangling the lure downward below therefrom. The line goes through the eyelet face end of the fishing lure. Therefore the distal end of the lure in its dangled state on the line is the "rear" hook end (opposite to eyelet end). Then, during casting, in a rod-pivoting, whipping action, the rotation of the fishing rod forward drags the weight of the fishing lure, which by virtue of its weight and length of the fishing line being released by the fishing reel, is thrown ahead of the distal end of the fishing line, hook/rearward end first (the lure pivoting somersault-wise after reaching the apex of the arc during the castoff about it's eyelet simulated head/face end so that the hooked tail is now the forward facing end heading into the air), with the hook pushing into the air, cutting a swath therethrough. The friction of the air against the rear (now after pivoting being the forward end) distal end of the forward advancing lure pushes that forward-facing, previously "rear"' segment rearward, so that as the lure advances forward, the forward moving distal hooked end segment is pushed rearward by force of the contact of the wind in the air, thence each segment is pushed rearward, until the collapsed state of the adjacent segments.

The resistance caused by the air friction against the forward moving distal hooked end segment of the forward advancing lure reduces its momentum. The remaining segments behind the forward moving distal end segment have less air friction resistance against them by nature of being shielded from air friction resistance due to being behind the forward facing end segment heading into the air and therefore have a greater forward moving momentum than the forward facing end segment.

The differential in momentum and air friction resistance between the front facing end segment (first segment heading into the air/wind) and all the remaining segments behind the forward facing end segment is important to the invention.

The lesser momentum (due to greater air resistance pushes the segment in a rearward direction) of the forward facing end segment and the greater momentum (less air resistance pushes segments in a forward direction) of all the remaining segments behind the forward facing end segments pushes the forward facing end segment in a rearward direction toward and into all the remaining segments behind it and conversely all the segments behind the forward facing end segment are being thrust forward toward and into the forward facing end segment.

These opposing forces causes the gaps/space between each segments to close making the lure assume a collapsed state, wherein each of the adjacent segments close and interlock, so that adjacent ends of respective segments contact each other.

Preferably, the segments are "reversed curved" such that the pointed apex of the curve is facing rearward, in a U shaped configuration with the open wide portion of the "U" facing toward the front when viewed from above. This pulls in water which expands and increases the space between the segments when the lure is in the water, and simulates the wiggling of a live bait fish.

By "wiggling", the term refers to the natural pivoting of the segments in either the forward/rear longitudinal axis, the up and down vertical axis and/or the side-to-side horizontal axis, or any three-dimensional combinations of two or more axes, including in any angular diversion of the longitudinal, vertical or horizontal.

However, when the lure hits the water, and is submerged in the water (or skims along the surface as in popper lures), the force of the water into these reverse curves (adjacent to the edge of the segments) causes the segments to physically separate from each other, so that the fish shaped lure lengthens in size, and appears to wiggle and pivot through the water, simulating, the movements of a real bait fish in one or more pivotable axes.

The expanded length and integrity of the lure body is maintained because the adjacent segments of the lure are connected by connectors, which permit axial collapsing of the segments during casting off in the air, and subsequent separation expansion or contraction of the segments in the water, thereby increasing the axial length and flexibility of the lure in the water to pivot in at least one of longitudinal, vertical or horizontal axes, or in any direction therebetween.

The connectors can be any connectors known to those skilled in the art, but include, and are limited to inter-lined connector pieces which recede into (and expand out of) partial recesses in adjacent lure segments. Preferably, there is a through wire up to each connector.

This receding and expansion of the lure segments can be accomplished, for example, by hinge connecting sleeves having axial lengths which permit wire connectors (preferably titanium) to move back and forth, toward or away from each other. Other suitable fasteners include small bicycle chain configured connectors, which can expand or reduce in length when folded over each other, or lamp-type ball chains, which include hollow balls with connecting wires which slide toward or away from the center of the balls.

An important feature is that the articulated linkage connectors connectible respective segments preferably are double hinges that move the segments above a) in and out; and b) side to side. For example, in the bead chain version of connectors has double hinges that moves both—a) in and out and b) side to side. Therefore there is a double pivot between each gap between each set of segments. The balls of the bead claim connectors recede completely within cavities in the respective segments. However, optionally, when the segments are separated from each other, a portion of each ball may protrude into the gap between the segments.

Beside the ball chain connectors, other linkages provided herein also act as double hinges, causing double pivots of the segments, both in and out, and side to side.

However, in each of the aforementioned movements of the segments towards or away from each other, it is noted that the segments can also move in multiple directions, besides longitudinally, such as vertically or horizontally or any angle therebetween.

The invention is therefore a "multi jointed fishing lure" or what is sometimes referred to as a jointed swimming plug (lure) in surfcasting circles.

As a frame of reference a "non-jointed" (one piece) swimming lure is made up of a fishing lure body component whose shape is primarily intended to replicate that of a swimming bait fish when being pulled through the water via the fishing line attached to the fisherman's reel. Other components such as a barrel swivel, split rings (same as used to hold door keys), hooks, possibly an internal weight or even an internal rattle that moves around inside the lure body to create a noise to attract fish are the remaining components in many cases that can be included in a fishing lure to be sold.

The present invention of Applicant herein is a fishing lure assembly that is referred to in the fishing lure industry as a "jointed" or "multi-jointed swimming lure or plug". A description of a "jointed/multi-jointed swimming lure or plug" can be described this way: 1)—Taking the initial "one piece" lure body whose shape has been designed to replicate that of a swimming bait fish and then cutting it (dividing) into segments or pieces; and, after the "one piece" lure body (shape) has been cut into pieces (segments) the segments are then connected/assembled to one another end to end by means of a hinge type metal connection, or in the case of the present invention known as a "Vertebrae™" lure a "continuous linkage" (not interrupted or disconnected at any point along its length). The segments are assembled longitudinally end to end in the same front to back order as they were prior to being cut. Therefore, once again the lure resembles the initially designed shape of a fishing lure, which is designed and intended to look and replicate that of a swimming bait fish, with the only difference being the lure/body (i.e. shape) is not one long continuous lure body, but actually two or more lure body segments connected together end to end, thereby creating the completed segmented lure. Creating a lure in segments as opposed to a "one piece", by means of a metal mechanical component (hinge/linkage) to connect the segments together, gives the lure a lifelike swimming "action" (movement) when being pulled through the water via the fishing line attached to the fisherman's reel or when simply holding the lure in suspension (via the fishing line) in swift moving water.

The present invention utilizes a continuous linkage, such as, for example, a custom manufactured continuous linkage, having hinges along the entire length of the linkage. The continuous linkage in essence may be, for example, one hinge after another connected to each other end to end via a connector, such as a hinge pin. The major improvements to prior jointed/multi-jointed lures produced today are that the linkage of the present invention of segments moves both longitudinally, horizontally and/or vertically. The lure uses what is termed in the fishing lure industry as "through wire construction" meaning the linkage runs internally through all the segments from the "nose" segment (front/first segment) to the "tail" segment (rear, last segment). Loops/eyelets are formed in the front and rear ends of the wire/linkage. These eyelets exit from the interior to the exterior of the lure body in the front nose segment and in the rear tail segment. The eyelets are a means to attach the fishing line to the lure body at the nose (front/first segment) and as a means to attach a hook to the tail segment (rear, last segment) of the lure body.

Many "one piece" "non-jointed" swimming lures/plugs manufactured with quality in mind do incorporate "through wire construction" in the form of one solid 1/16" stainless steel wire running internally through the lure body from end to end. The fisherman's line is tied directly to this stainless steel wire in the front nose area of the lure where the loop/eyelet has been formed in the wire at the point where the wire loop/eyelet exits the lure body. As mentioned earlier the loops/eyelets formed in each end of the wire are a means to attach the fishing line to the lure body at the nose (front/first segment) and as a means to attach a hook to the tail segment (rear, last segment) of the lure body. Many "jointed/multi-jointed swimming lures or plugs" do not utilize "through wire construction". However, occasionally there is a "jointed/multi-jointed swimming lure or plug" that incorporates "through wire construction". The present invention is an improvement to almost all jointed/multi-jointed swimming lures currently being produced/manufactured and sold on the market today, because the lure's segments can move longitudinally, vertically, horizontally or at any angle therebetween. This is a significant improvement to the strength of the lure as it relates to the weight/size of the fish which a fisherman is able to catch and successfully "land" (bring home) without the lure failing (breaking apart).

The new "Vertebrae™" lure of the present invention has the ability to land fish up to 400 lbs., more or less. The second significant feature of the "Vertebrae™" lure can be described as follows: all jointed/multi-jointed swimming lures have a "gap" (space) in-between each segment, this gap imparts to the hinge between each segment the space (room) that is needed to allow each segment to "swing" (move) from side to side. The segments swing (move) in opposite directions from the segment in front and behind it. Each segment has the ability to "swing" (move) from side to side in opposite directions from the segment in front and behind it and is what gives a jointed/multi-jointed swimming lure the ability to replicate the look and "action" of a naturally swimming bait fish when moving through the water. The major feature that is an improvement in the present invention and for which a patent is applied for is the custom manufactured internal linkage mentioned earlier that gives the segments the ability to swing like a hinge, in one or more of the longitudinally front to back axis, the up and down vertical axis and/or the side-to-side horizontal axis, or at any angle therebetween.

The most significant component of the present invention is the ability of the Vertebrae's linkage to open and close (moves in and out), which changes the length of the lure, so that the segments contact each other during contraction of the longitudinal lengthwise axis of the lure. The custom manufactured linkage has the ability to swing like a hinge and also open and close (move in and out), which is paramount to the fishing lure of the present invention because it is a new and revolutionary design which upon information and belief, has never been produced/manufactured before.

The significance and importance of this feature is that after casting and while the lure is in flight in the air, the lure segments come together ("close") and the lure is basically indistinguishable from that of a non-jointed (one piece body) lure. Upon information and belief, this feature has not before been achieved or brought to market. Current jointed/multi-jointed swimming plugs/lures do not have this ability to contract adjacent to each other and therefore cannot move through the air as aerodynamically or accurately as the Vertebrae™ lure of the present invention does.

The "Vertebrae™" lure's ability to transform itself via the ability of each of its segments to come together and "close the gap" (space) between each of its segments into virtually a "one piece" lure body creates a streamlined aerodynamically correct shape for moving (flying) through the air increasing the distance and accuracy the fisherman is able to achieve exponentially.

For example, the fishing lure includes a linearly-disposed plurality of independently movable, linked articulated segments, which are fastened to each other, like links in a chain.

The aforementioned plurality of segments each have a leading head segment at a front end of the chain of segments to attach the line thereto, and a trailing tail segment for the hook, where the trailing tail segments include a rear end of the chain, with a plurality of body segments therebetween. All of the segments further have a top region and an opposite bottom region, where the top and bottom regions correspond to the respective opposite dorsal and pelvic regions in the anatomy of a baitfish. The connection of the segments is by a connector, such as, for example, an eyelet for affixing the fishing line thereto.

The plurality of body segments each respectively include a forward end and an opposite rear end, where the plurality of segments have a head-to-tail longitudinal axis extending therethrough, and where each segment has a side to side horizontal axis extending therethrough, so that the respective longitudinal and horizontal axes are in perpendicular disposition relative to each other.

The plurality of segments each also have a top-to-bottom vertical axis extending vertically from the top region of the respective segments, through the aforementioned bottom region of the respective segments, where the respective segment vertical axes are in perpendicular disposition relative to the longitudinal and horizontal axes.

The aforementioned head, tail and respective body segments arc connected to each other with articulated linkage, permitting the respective segments' respective forward ends and the respective rear ends to move in articulated relation to each other, such that in accord with the articulated linkage, the respective individual segments are movable along the longitudinal axis between opposed open and closed positions, where the closed position includes a minimum spaced-apart distance extending between each respective segment and its next-in-line counterpart. Furthermore, the open position includes a maximum spaced-apart distance between each respective segment and its next-in-line counterpart. Additionally, the respective segments are free to move independently of each other about each of the three aforementioned longitudinal, horizontal and vertical axes, or at any angle therebetween, while the respective segments remain mechanically linked together in the chain of the lure.

The free movement of the respective individual segments from the open position to the closed position results from slidable urging together of the segments by compressive aerodynamic dragging force applied against the in-flight tail segment during casting of the fishing lure, and compressive force being communicated by the tail segment along the longitudinal axis, the non-tail segments.

The free movement of the respective individual segments from the aforementioned closed position to the open position, results from the slidable urging apart of the segments, by tensioning dragging hydraulic force being applied to the fishing lure when immersed in water being fished, and wherein the head segment to which the line is attached, is dragged by force upon the fishing line, so that the dragging hydraulic force being applied to the respective segments by water flowing relatively rearwardly along and in between the aforementioned respective segments of the fishing lure, when the head segment communicates the dragging force of the fishing line longitudinally to the non-head segments.

When the line and lure are cast off in the air, the tail segment with at least one hook acts as an airtight leading segment, wherein through-air cast of the fishing lure by the fisher person includes tail-first airborne flight of the fishing lure.

While connectors may be defined as connectors enabling the expansion and contraction of the segments of the fishing lure, it is known that one embodiment, the articulated linkage means includes at least one longitudinally disposed hollow-ball-and-chain means, where the chain means includes a plurality of hollow balls linked together by a plurality of chain rod link members extending through a pair of oppositely disposed apertures within the hollow balls. The hollow balls and chain rod link members are made of a suitably strong material and are suitably resistant to aquatic conditions found in a fishing environment.

These link rod members have stop means disposed thereon within the cavities of the aforementioned hollow balls, for allowing the link rod members to freely and slidably move within the aforementioned hollow ball apertures between an interior position, wherein the link is disposed substantially within the ball cavity, and an exterior position wherein the aforementioned link is disposed substantially outside of the ball cavity; and wherein the stop means prevent the link rod means from falling out of the cavity in the hollow ball of a ball and chain link.

In this embodiment, the respective fishing lure segments have matched opposing cavities to receive, respectively, a portion of at least one ball per respective segment within the matched opposing cavities; and wherein the hollow chain balls are fixed within the respective fishing lure segments by a fixing means; and wherein the at least one longitudinally disposed hollow-ball-and-chain means is disposed within each of the respective fishing lure segments, which combined comprise at least one movable chain rod link between each respective fishing lure segment and the next-in-line segment.

The ball and chain embodiment can also have an articulated linkage made up of at least one longitudinally disposed hollow-ball-and-chain means further means a single strand which is longitudinally disposed as a hollow-ball-and-chain.

Alternative, the fishing lure may have an articulated linkage means including at least two parallel longitudinally disposed hollow-ball-and-chain strands.

Additionally, the matched opposing cavities are respectively disposed in opposite registration to each other in the respective top region and an opposite bottom region of the respective fishing lure segments.

In another embodiment, with flat, articulated lines, the articulated linkage means includes at least one longitudinally flat link and wire means, wherein the wire means includes a plurality of wires respectively shaped into a plurality of respective open connectors, such as, for example, rectangles, wherein the rectangles have respectively, an open slot in one of the sides of the rectangles of the plurality of rectangles; wherein the flat link means includes a plurality flat-shaped elongated links having a flat-shaped internal cavity therethrough, whether the internal cavity of the plurality of respective flat links is in slidable engagement with the respective plurality of respective open wire rectangles, so that the respective plurality of respective open wire rectangles move freely and slidably within the plurality of respective flat links; and wherein the respective fishing lure segments each have matching cavities to receive at least one of the respective plurality of respective open wire rectangles, wherein the segment cavities are disposed in the respective forward end and an opposite rear end of the respective segments, The respective forward end and an opposite rear end of the respective segments has a fastener assembly, therewithin, to fasten the one or more of the respective plurality of respective open wire rectangles within the respective forward and rear ends of the segment cavities, wherein the respective plurality of respective open wire rectangles and the plurality of respective flat links are made of a suitably strong material, which is suitably resistant to aquatic conditions found in a fishing environment.

In an open sleeve link chain, the articulated linkage means includes at least one longitudinally disposed pair of U-shaped links engaged with each other, wherein one of the U-shaped link members has hollow arms of the U-shaped, wherein the arm-hollows include sufficiently large elongated openings to receive the other member of the pair of U-shaped links, in slidable mounting, with a stop so as to maintain engagement of the U-shaped link members while permitting free movement of the members of the at least one pair of engaged U-shaped links. The respective fishing lure segments have matching cavities to receive at least one of the aforementioned respective plurality of respective pairs of U-shaped links, wherein the segment cavities are disposed in the respective forward end and an opposite rear end of the respective segments. The respective forward end and an opposite rear end of these respective segments has a fastener therewithin to fasten the at least one of the respective plurality of pairs of U-shaped links within the respective forward and rear ends of the segment cavities. It is also known that the respective plurality of respective U-shaped links are made of a suitably strong material suitably resistant to aquatic conditions found in a fishing environment.

In a further articulated linkage, the articulated linkage includes at least one link member rotatably disposed in opposing cavities within the forward end and an opposite rear end of adjacent respective fishing lure segments, the aforementioned opposing cavities have fastening means therewithin to fasten the at least one link member within the respective forward and rear ends of the adjacent segment cavities. These links include a forward end and an opposite rear end, where the forward end of the link member fits receivably within the forward end cavity of a respective fishing lure segment, and the rear end of the link fits receivably within the rear end cavity of a respective fishing lure segment.

Additionally, the at least one link member may include a pair of oppositely disposed spherically-shaped cavities and a pair of pins, where the pins fit receivably within the oppositely disposed cavities, and wherein the adjacent fishing lure segments linked by the at least one link member are freely movable about the link.

During and after casting off in the air, the independent movement of the respective fishing lure segments under hydraulic tension includes movement about the longitudinal axis, about the horizontal axis, about the respective segment vertical axes, or at any one or more angular orientations, to simulate a composite wiggling motion analogous to the swimming of a bait fish.

After the lure is immersed in the water, the independent movement of the aforementioned respective fishing lure segments under hydraulic tension includes movement about the longitudinal axis, the horizontal axis and about the respective segment vertical axes, in a composite wiggling motion analogous to the swimming of a bait fish.

Moreover, the tail segment preferably has a hook and the non-tail segments may have at least one additional fishhook assembly linked thereto by an articulated linkage, so that the hook can follow the movement of the segments. Optionally, more than one hook may be provided as a belly hook.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
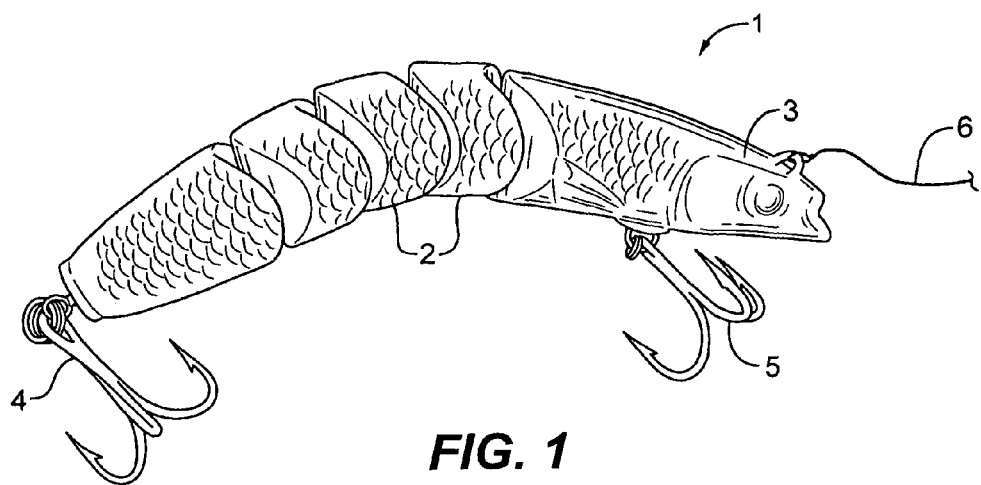
FIG. 1 is a perspective view of the lure of this invention.

FIG. 1 is a view of the lure 1 of this invention showing articulated segments 2, eyelet 3 for fishing line 6, tail with hook cluster 4 and front hook cluster 5.

Figure 1A:
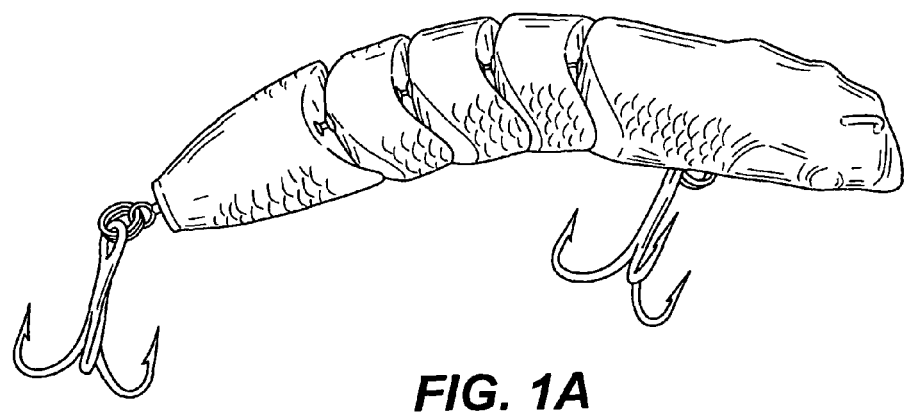
FIG. 1A is a photograph of a perspective view of the lure of this invention in an expanded state.

FIG. 1A is a stationary photograph showing the lure of this invention figuratively in an expanded state.

Figure 2:
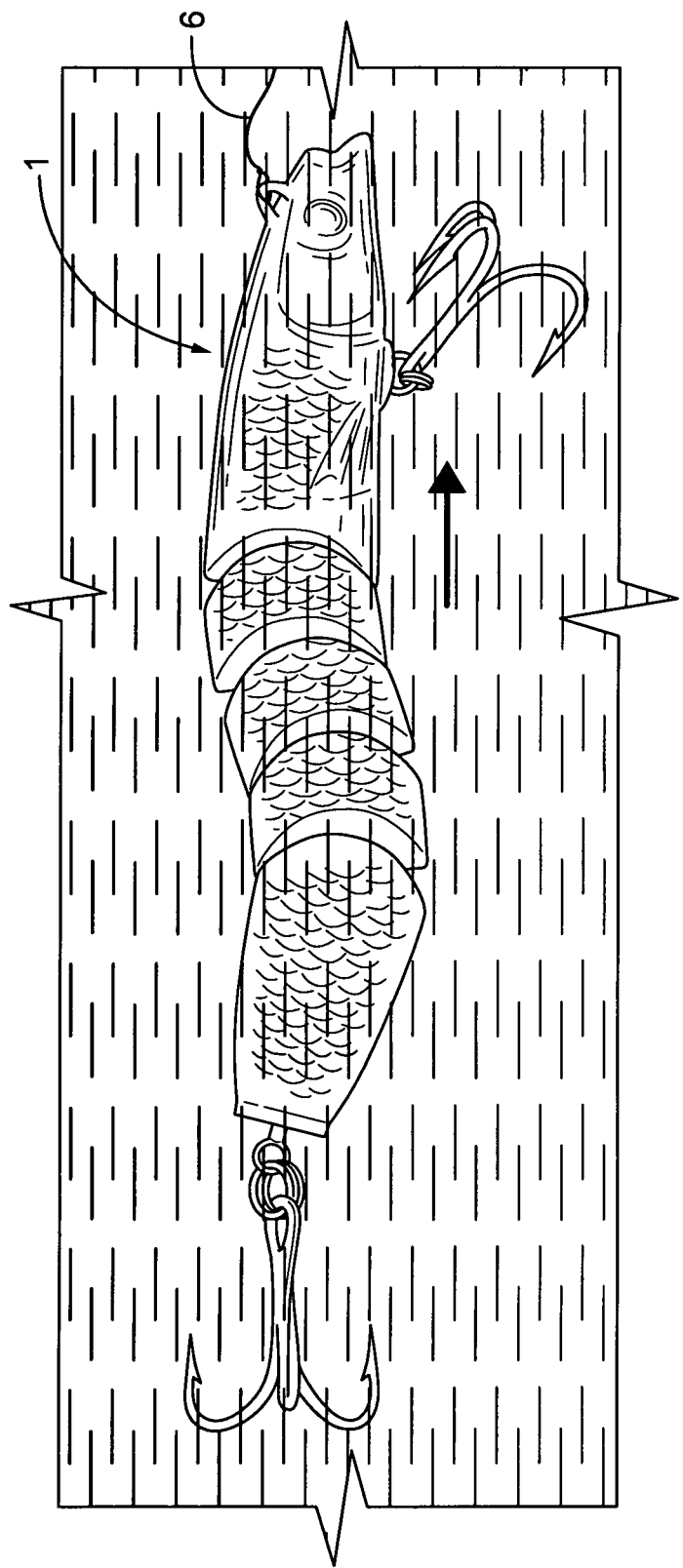
FIG. 2 is a top view of the lure of this invention under water and being pulled forward from a line, wherein the segments permit the lure to expand and contract both longitudinally and at a different direction off of the longitudinal, vertical and horizontal axes of the lure.

FIG. 2 is a top view of lure 1 in water being pulled by line 6. The same view would also be a depiction of lure 1 restrained by a fixed line 6 but in a current from front to back. In either case, the gaps between segments are forced open by hydraulic action and normal drag. This also induces lateral wiggles as shown, which may extend in any pivotal direction off of one or more of the horizontal, vertical and/or longitudinal axes.

Figure 3:
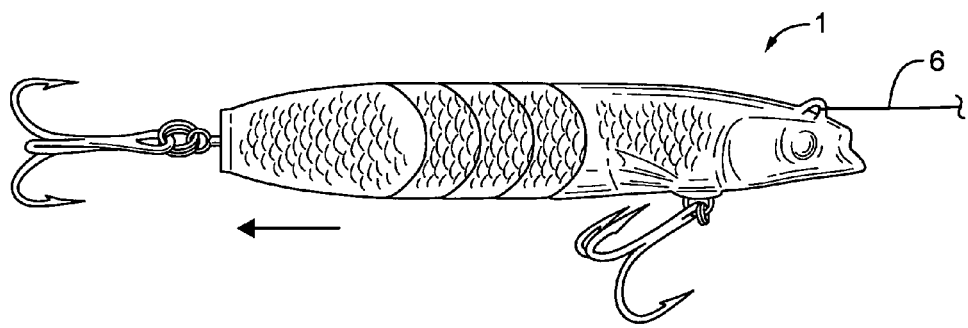
FIG. 3 is a top view of the lure in the air as in mid-cast.

FIG. 3 is a top view with the lure in air being cast, Note that the segment gaps have been closed as by air friction creating a streamlined body which enhances the casting accuracy and distance.

Figure 3A:
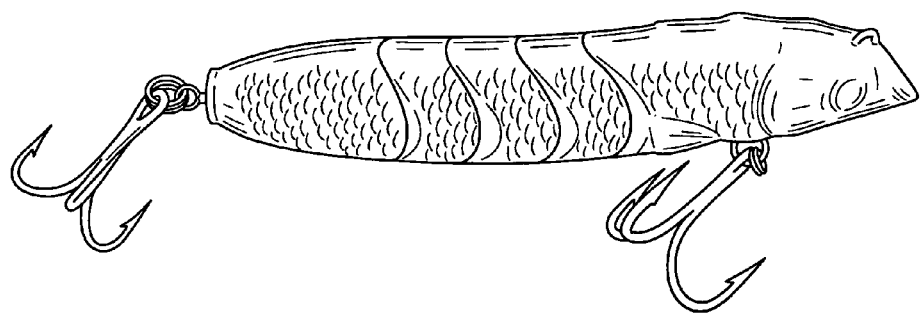
FIG. 3A is a photograph of a perspective view of the lure in a contracted, collapsed state.

FIG. 3A is a stationary photograph showing the lure figuratively in a contracted, collapsed state.

Each segment 2 is assembled from two left and right half segments which have one or more interior recesses to accept one or more longitudinally extending chains therein. The two half segments are bonded or otherwise fastened together to form a single segment 2, with one or more recesses 9 to accept chains 10 (FIG. 4), 20 (FIG. 5) or 30 (FIG. 8) therein. While other materials may be used to form preferably solid segment 2, such as resins, plastics or wood, preferably segments 2 are made from a cured mixture of a resin, such as urethane and fillers, in order to make lure 2 buoyant in the water yet strong to resist damage. While the aforementioned resin and fillers permit buoyant solid segments, alternately the segments may be hollow and buoyant.

Figure 4:
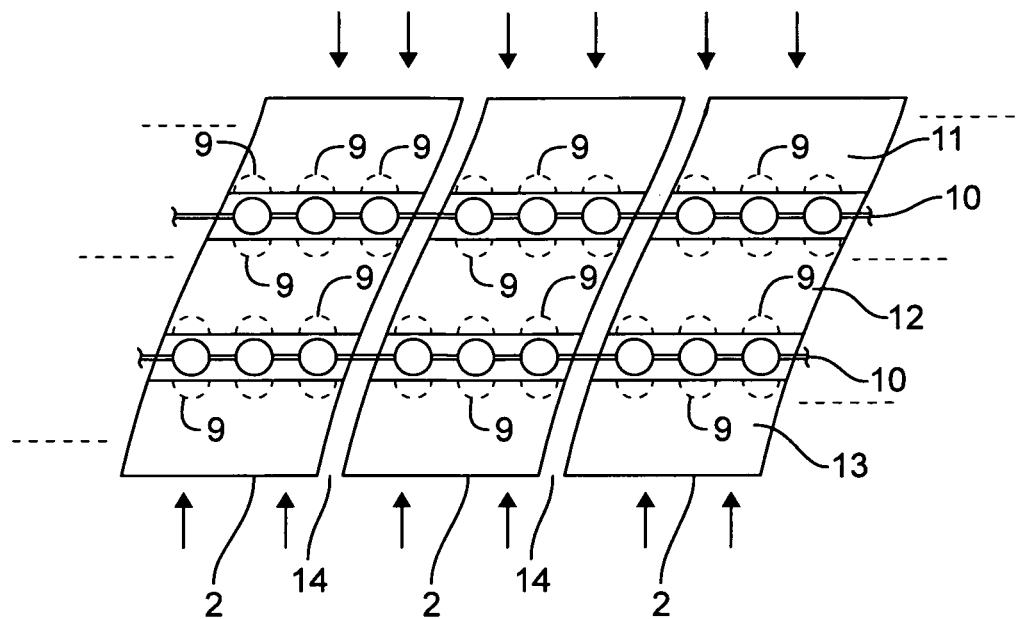
FIG. 4 is a side exploded view detail of three lure segments, illustrating the two continuous parallel ball chains, extending through the three lure segments, in a vertical plane.

While a wide variety of mechanical connections between lure segments can be used, the preferred embodiment uses a continuous ball chain which permits lateral wiggling when in water and inter-segment gap closure when in air. The ball chain is embedded in the segments at the lateral center. Multiple chains such as two or three can be used at multiple side elevations to limit the up/down articulation and better control the desired lateral motion. FIG. 4 is a side view detail exploded view with the hollow chain balls shown in cross section. In this figure, two ball chains are used. Three segments 2 are shown; they are each shown with a top section 11, a middle layer section 12 and a bottom section 13. The three sections or layers are shown with two ball chains 10 under tension, located within molded cavities 9 positioned within each segment 2 at locations corresponding to the areas between top section 11 and middle section 12 and between middle section 12 and bottom section 13. Note that top sections 11 have molded cavities 9 (hemi-spherical) on the bottom surface in registration with top chain 10. Middle section 12 also has cavities 9 in registration with the same chain on its top surface. Bottom section 13 and bottom surface of middle section 12 have cavities 9 in registration with bottom chain 10. By bonding the two sections of each segment 2 around the ball chains 10, the chain will be encapsulated within the segments 2, leaving gaps 14 between segments 2 whenever there is tension. The bonding of the half segments can be accomplished by mechanical fasteners or by adhesive or heat sealing. Note that by pushing segments 2 together from the ends, gaps 14 will be closed as the balls of chain 10 on either side of gaps 14 are brought closer together moving the wire segments at the gap to withdraw within the balls.

Figure 4A:
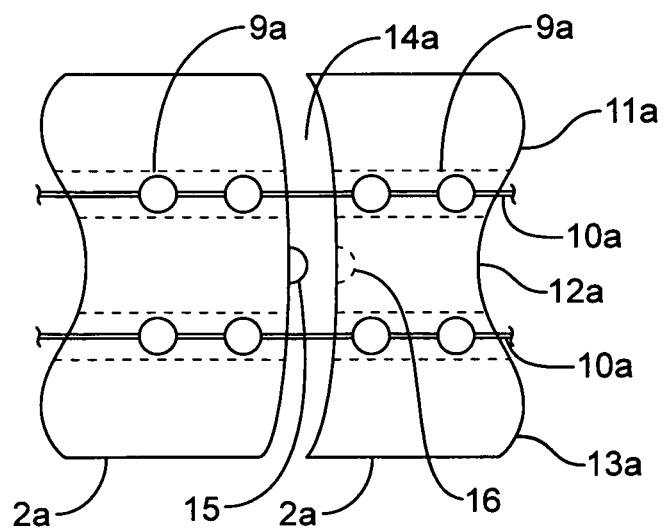
FIG. 4A is a side exploded view detail of an alternate embodiment of a fishing lure, showing two adjacent lure segments, illustrating the two continuous parallel ball chains, extending through the two lure segments, in a vertical plane, as well as a protruding member interlocking with a corresponding recess in an adjacent segment, to further align the segments together during casting.

FIG. 4A shows an alternate embodiment of a fishing lure, showing two lure segments 2a, illustrating two continuous parallel ball chains 10a, extending through the gap 14a between two lure segments 2a, in a vertical plane, as well as protruding member 15 interlocking with a corresponding recess 16 in an adjacent segment 2a, to further align the segments 2a when they come together during casting. Segments 2a are each shown with top section 11a, mid section 12a and lower section 13a.

Figure 5:
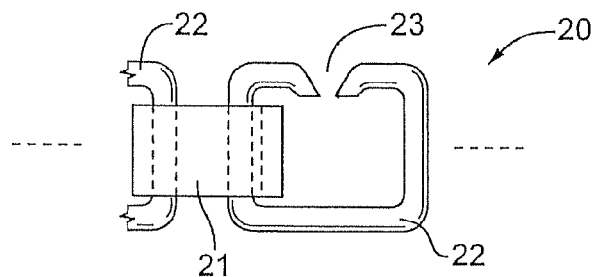
FIG. 5 is a side view of a chain using alternating flat slotted links and wire loops as used to attach lure segments to each other.
Figure 6:
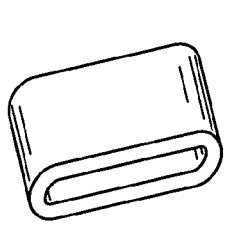
FIG. 6 is a perspective view of the flat slotted link of the chain in FIG. 5.
Figure 7:
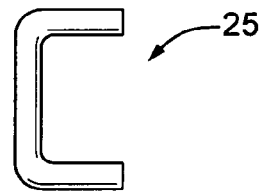
FIG. 7 is an alternative wire link for the chain of FIG. 5.

In a second embodiment of this invention, a continuous chain of alternating links of two different types is used to attach the lure segments. A top view of this chain 20 is shown in FIG. 5. The chain comprises slotted flat links 21 (see FIG. 6) engaged with wire links 22 having an assembly gap 23. This chain under tension can be fitted in shaped cavities with the segments 2. The segments 2 are separated into left and right half segments and have molded recesses the shape of the central portion of wire link 22. In a process similar to the encapsulating of the bead chain of FIG. 4, the two halves of each segment 2 are bonded over wire links 22 with the gap region 23 locking wire links 22 solidly within each segment 2. Recesses for flat slotted links at leading and trailing edges of each link 2 insure that gaps between links can articulate laterally to permit wiggling under water and that the gaps can close easily when casting. While the continuous chain affords strength to lure 1, an alternative wire link 25 shaped as a U (see FIG. 7) for light duty is possible by just inserting the two ends of link 25 into holes in the end of each segment 2 and adhesively bonding. Instead of wire links 22, the slotted links 21 can accommodate hinge pins moving away or towards each other, whereby the hinge pins are embedded in each respective segment, so that the segments move toward or away from each other.

Figure 5A:
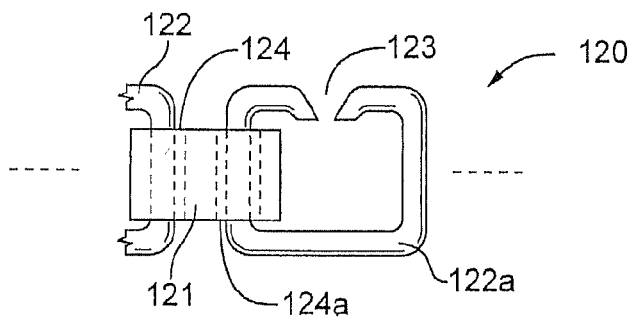
FIG. 5A is a side view of an alternate embodiment of a chain using a linkage with non-adjustable through holes for pins for attaching lure segments to each other.

In a further third alternate embodiment, as shown in FIG. 5A, instead of retaining members 22 slidably movable back and forth within open slot of link 121, the retaining members 122, 122a of FIG. 5A pivot within fixed through holes 124, 124a (one for each retaining member 122). While this does not permit the segments to move towards and away from each other in the contraction and expansion modes during casting, it does provide a double hinge between adjacent segment, whereby the respective segments pivot about either retaining member 122 or retaining member 122a in respective through holes 124 and 124a. Therefore, the segments now move about one or both pivot points provided by retaining members 122 or 122a within through holes 124 or 124a.

Figure 5B:
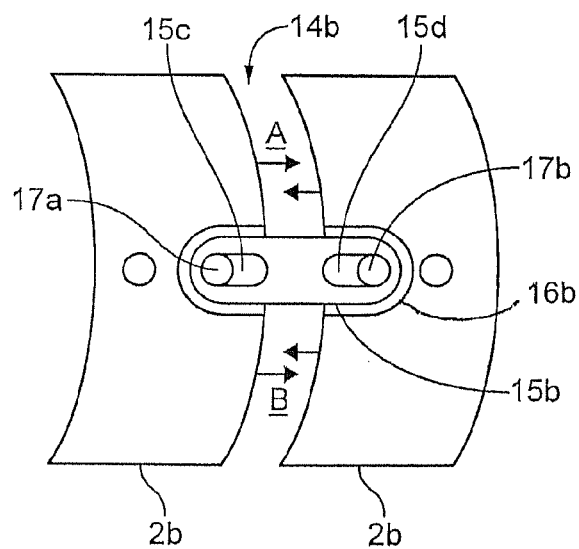
FIG. 5B is a top view of an alternate embodiment for adjacent segments having a slotted member insert able within a corresponding recess in an adjacent segment during casting.

In a related further embodiment shown in FIG. 5B, segments 2b separated by a gap 14b, are attached by a slotted member 15b having slots 15c and 15d to accommodate pins 17a and 17b embedded within respective segments 2b. Slotted member 15b moves within recess 16b when the segments 2b close and interlock together during casting. With this embodiment, segments 2b, 2b collapse and expand toward and away from each other in the directions of arrows A and B.

Figure 5C:
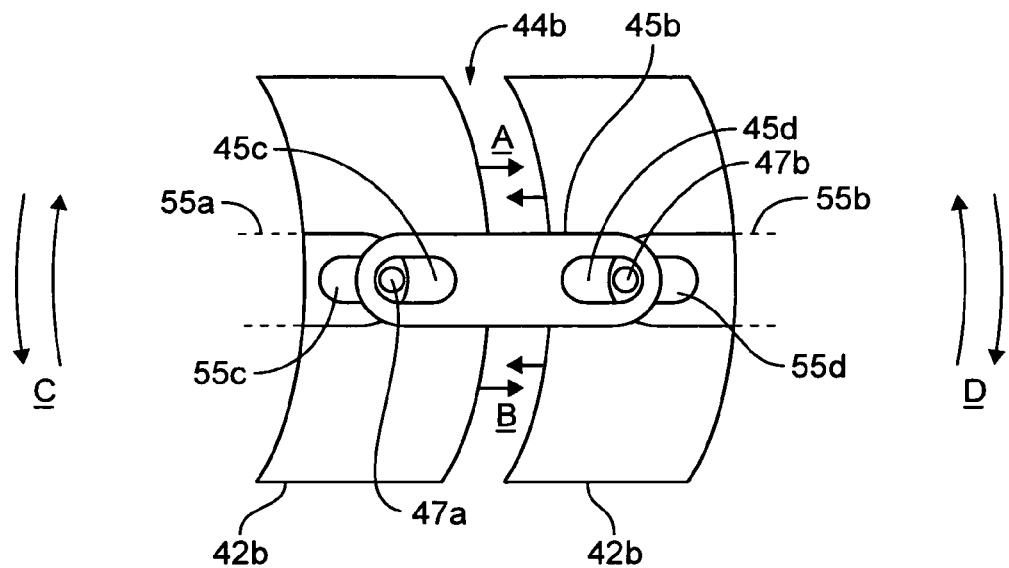
FIG. 5C is a top view of a further alternate embodiment for adjacent segments having a slotted member with a pair of opposite pivot points overlaying a further slotted member pivoting over one of the aforementioned pivot points and pivoting also over a further pivot point in an opposite direction in an adjacent segment, wherein respective links move within respective slots of the slotted members about respective pins fixed in the respective segments, during casting.

FIG. 5C shows another further alternate embodiment for adjacent segments 42b, 42b separated by gap 44b during expansion in the water, each segment 42b having a slotted link member 45b with slots 45c and 45d and a pair of opposite pivot points about pins 47a and 47b, overlaying a further slotted link members 55a or 55b, pivoting over one of the aforementioned pivot points about fixed pins 47a or 47b and pivoting also over a further pivot point having a pin (not shown) in an opposite direction in an adjacent segment (not shown), wherein respective segments 42b, 42b, having fixed pins 47a, 47b, about which pins the slotted link members 45b, 55a and 55b are movable, move longitudinally toward each other and interlock during casting, as the slotted member 45b overlays respective slotted members 55a, 55b with slots 55c and 55d. With this embodiment, segments 42b, 42b collapse and expand toward and away from each other in the directions of arrows A and B, but also maximize pivoting about the pivot points in the directions indicated by arrows C and D.

Figure 8:
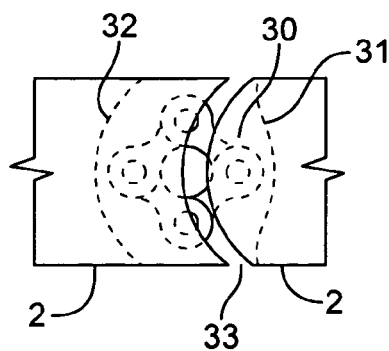
FIG. 8 is a top view of a segment using four miniature roller chain links in a diamond configuration to attach adjacent lure links.

In yet another further alternate embodiment of this invention, four miniature roller chain links are assembled into diamond configuration to attach adjacent segments 2. FIG. 8 is a top view detail in partial cutaway of two partial segments 2 attached in this manner; gap 33 is shown at about midway. Four link diamond configuration 30 is shown coupling two adjacent lure segments 2 via the two vertical pins engaged with the links 2. The two vertical pins engage two links each permitting vertical pins to move closer together (wider gap 33) or farther apart (gap 33 closed). Four link diamond 30 is housed in recesses 31 and 32 in the ends of an adjacent pair of segments 2. This embodiment offers restriction of relative up/down movement of adjacent links while permitting easy horizontal, lateral or vertical movement or at any angle therebetween to simulate excellent wiggle performance and well controlled low-friction open/close gap movement.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A fishing lure, comprising:
 a) a linearly-disposed plurality of independently movable linked articulated segments connected together using a ball chain fastening arrangement comprising ball members connected to each other with connectors extending between adjacent ones of said ball members, and said linearly-disposed plurality of independently movable linked articulated segments collectively forming a body having a shape which replicates that of a swimming bait fish when pulled through water via a fishing line attached to a fisherman's reel;
 b) each of said segments having a plurality of longitudinally extending passageways which are laterally spaced from each other, said passageways in each of said segments being aligned with said passageways in adjacent segments of said plurality of segments;
 c) each of said passageways having spaced oppositely facing molded hemi-spherical cavities encapsulating said ball members of said ball chain fastening arrangement;
 d) facing surfaces on ends of the adjacent segments of said plurality of segments being reversed curved to pull in water which expands and increase space between the adjacent segments of said plurality of segments when the lure is in the water, and simulates the wiggling of a live bait fish;
 e) all of said ball members in said passageways which are aligned with one another being joined by said connectors which permit both axial separation such that said segments are in an expanded state wherein gaps are formed between said facing surfaces of the adjacent segments of said plurality of segments and axial contraction such that said segments are in a collapsed state wherein the adjacent segments of said plurality of segments come together such that the adjacent segments of said plurality of segments contact each other along said facing surfaces so that there are no gaps between the facing surfaces of the adjacent segments of said plurality of segments during casting, said axial separation occurring when said fishing lure is in the water for increasing axial length and flexibility of the lure in the water to pivot in at least one of a longitudinal, vertical or horizontal direction;
 f) one or more fish hooks mounted on said lure; and
 g) a head segment having at least one eyelet for affixing said fishing line thereto.

2. The fishing lure of claim 1 wherein said segments are made from a cured mixture of resin in order for said lure to be buoyant in water yet sufficiently strong to resist damage.

3. The fishing lure of claim 2 wherein said ball chain fastening arrangement is encapsulated in each of said segments.

4. The fishing lure of claim 1 wherein independent movement of said segments under hydraulic tension comprises movement in horizontal and vertical directions.

5. The fishing lure of claim 4 wherein the independent movement of said segments comprises a composite wiggling motion analogous to the swimming of a bait fish.

6. The fishing lure of claim 1 wherein said head segment has at least one of the one or more fish hooks linked thereto by articulated linkage means.

* * * * *